United States Patent [19]

Saito et al.

[11] 4,292,495
[45] Sep. 29, 1981

[54] WELDING TORCH WEAVING DEVICE

[75] Inventors: Takashi Saito; Katuhiko Otake, both of Kamakura; Tokuji Maruyama, Fujisawa, all of Japan

[73] Assignee: Kobe Steel, Limited, Kobe, Japan

[21] Appl. No.: 122,853

[22] Filed: Feb. 20, 1980

[51] Int. Cl.³ .............................................. B23K 9/30
[52] U.S. Cl. .................................. 219/125.12; 228/28
[58] Field of Search .................. 219/69 V, 125.12; 228/27, 28

[56] References Cited

U.S. PATENT DOCUMENTS

| | | | |
|---|---|---|---|
| 2,472,803 | 6/1949 | Beyer et al. | 219/125.12 |
| 3,185,814 | 5/1965 | Rössner et al. | 219/125.12 |
| 3,571,557 | 3/1971 | Valentine | 219/125.12 |
| 3,681,564 | 8/1972 | Hiyama et al. | 219/125.12 |
| 3,764,777 | 10/1973 | Sakabe et al. | 219/125.12 |

FOREIGN PATENT DOCUMENTS

| | | | |
|---|---|---|---|
| 2918891 | 11/1979 | Fed. Rep. of Germany | 219/125.12 |
| 51-12457 | 4/1976 | Japan . | |
| 51-20345 | 6/1976 | Japan . | |
| 51-92761 | 8/1976 | Japan | 219/125.12 |
| 53-45172 | 12/1978 | Japan | 219/125.12 |

Primary Examiner—Gene Z. Rubinson
Assistant Examiner—Keith E. George
Attorney, Agent, or Firm—Oblon, Fisher, Spivak, McClelland & Maier

[57] ABSTRACT

The present invention provides a welding torch weaving device having a first link with an elongated slot and driven by a drive source to make an arc shaped movement at one end thereof, a first movable shaft fitted or secured within the elongated slot in the first link, a second link having one end thereof pivoted in place on the first link and having a second elongated slot, a second movable shaft fitted within the second elongated slot in the second link, a third link having one end thereof pivoted in place on the other end of the second link and a fourth link having one end thereof pivoted in place on the other end of the third link and the other end thereof pivoted on a fixed pivot shaft. A weaving arm is disposed in place on the third link for mounting a welding torch.

5 Claims, 8 Drawing Figures

WELDING TORCH WEAVING DEVICE

BACKGROUND OF THE INVENTION

1. Field of the Invention

This invention relates to the structure of a welding torch weaving device, and more particularly to machine geometry capable of adjusting a two-dimensional weaving pattern with ease and flexibility.

2. Description of the Prior Art

With the development of semi or completely automatic welding techniques, a variety of devices have been utilized to weave welding torches in $CO_2$, MIG and non-gas welding processes. There have been generally two types of weaving techniques: (1) varying only the weaving amplitude with the weaving pattern unchanged (one-dimensional weaving) and (2) varying the weaving pattern per se according to variations in groove shape, etc. (two-dimensional weaving).

In the former case, patterns are linear and circular and an example of the machine geometry is depicted in FIG. 1. A weaving device 1 includes a cam 3 attached to an output shaft of a motor 2 mounted on a frame 5 and a rotary plate 4 supported slidably on a support board 7 rotatable on part of the frame 5. A welding torch 8 is lodged on the point of the rotary plate 4 having the opposite end thereof in which an elongated slot 4' is formed to receive the cam 3 therein. A roller 6' is disposed on a rear end of the rotary plate 4 and held in an elongated slot 6 in a wall 5' integral with the frame 5. If the motor 2 is energized, the rotary plate 4 starts rotating about the support board 7 to weave the torch 8. This behavior of the torch is one dimensional and the weaving pattern is not variable per se although the amplitude and speed are easily changeable.

In order to increase the welding amount per bath or to avoid poor fusion welding imperfections, such as inclusion of slag, weaving has been extensively studied and investigated. Some welding machines have been accompanied by two dimensional weaving devices.

Various two dimensional patterns are illustrated in FIG. 2 and are fully available for vertical butt welding, fillet welding, etc. The prior art weaving device developing such a two dimensional pattern generally combines two rotating movements through the use of gears and cams whether it includes a combination of multiple drive sources or a common drive source. The former uses individual motors for X axis and Y axis movements to describe in combination patterns such as a triangle and a trapezoid. The latter is disclosed in Japanese patent publications No. 51/12457 and No. 51/20345, for instance, wherein a single motor drives two gears for two different vibrations to describe two dimensional patterns. Those prior art weaving devices are thus complicated in structure and large in dimension and often suffer from low reliability. They are useful within only a limited range of applications such as special purpose automatic welding machines for a particular welded joint.

With the recent development of automatic welding machines compatible with various welding devices and various welding positions, it is most desirable that the weaving device have a higher welding efficiency, higher reliability, a simplicity of structure, a smaller size and be easy to handle through the use of a control circuit. The present inventors have earlier developed a small sized and effective weaving mechanism which easily weaves a torch in a two dimensional manner. Further investigation has been conducted to seek a weaving device having excellent wear resistance and stable operation for prolonged use.

As a consequence of this investigation, the Applicants succeeded in enhancing wear resistance through a combination of links while basically retaining the concept of the earlier weaving device.

SUMMARY OF THE INVENTION

The present invention provides a welding torch weaving device having a first link with an elongated slot and driven by a drive source to make an arc shaped movement at one end thereof, a first movable shaft fitted or secured within the elongated slot in the first link, a second link having one end thereof pivoted in place on the first link and having a second elongated slot, a second movable shaft fitted within the second elongated slot in the second link, a third link having one end thereof pivoted in place on the other end of the second link and a fourth link having one end thereof pivoted in place on the other end of the third link and the other end thereof pivoted on a fixed pivot shaft. A weaving arm is disposed in place on the third link for mounting a welding torch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
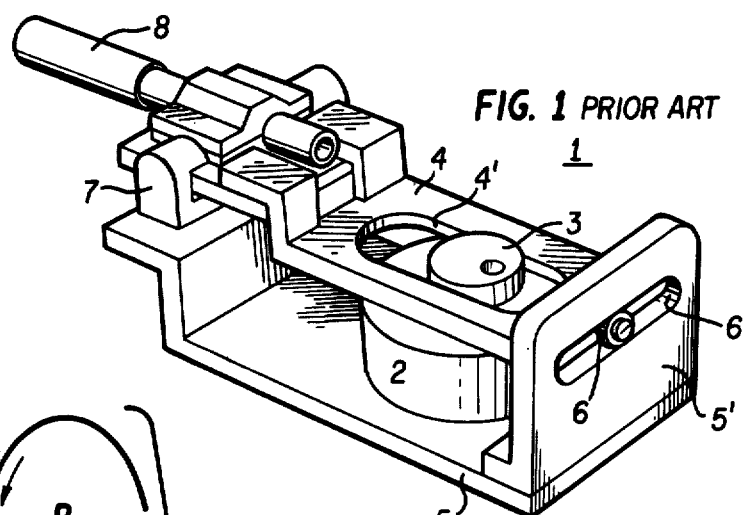
FIG. 1 is a perspective view of a prior art weaving device.
Figure 2:
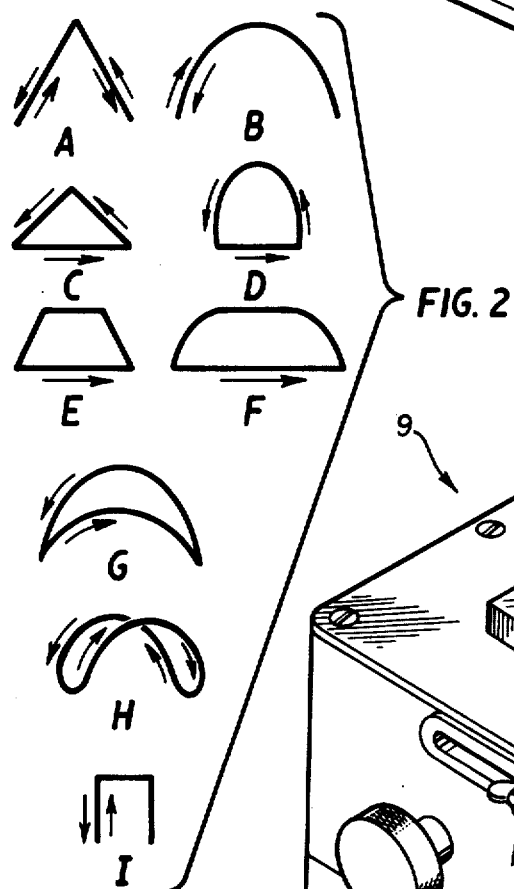
FIG. 2 is a diagram of illustrative two dimensional weaving patterns.
Figure 3:
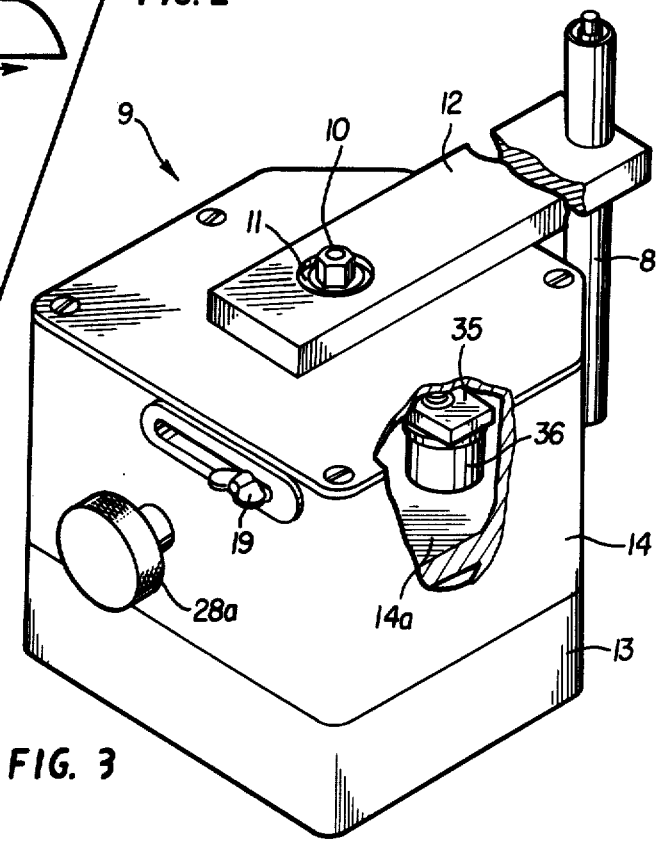
FIG. 3 is a perspective view of a welding torch weaving device according to an embodiment of the present invention.
Figure 4:
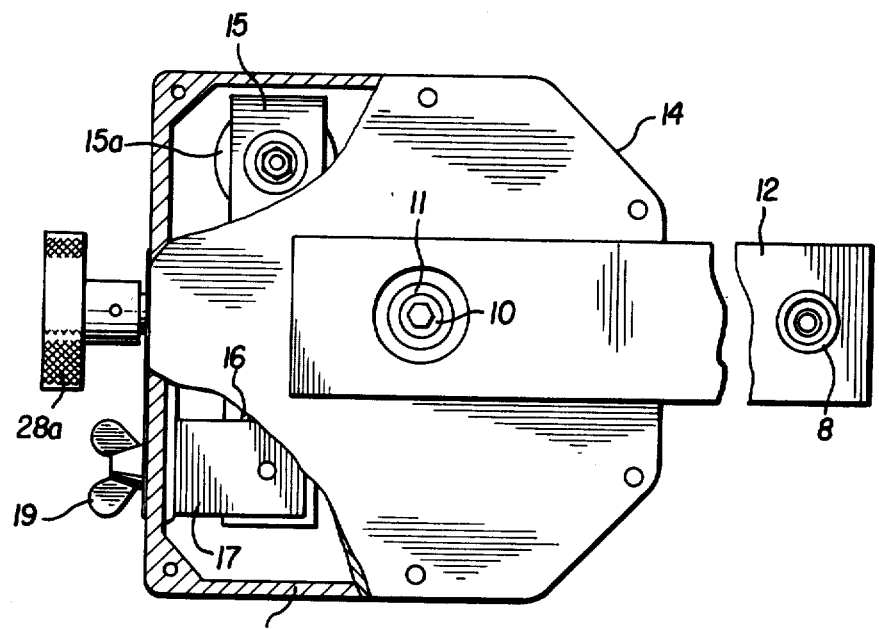
FIG. 4 is a plan view of FIG. 3.
Figure 5:
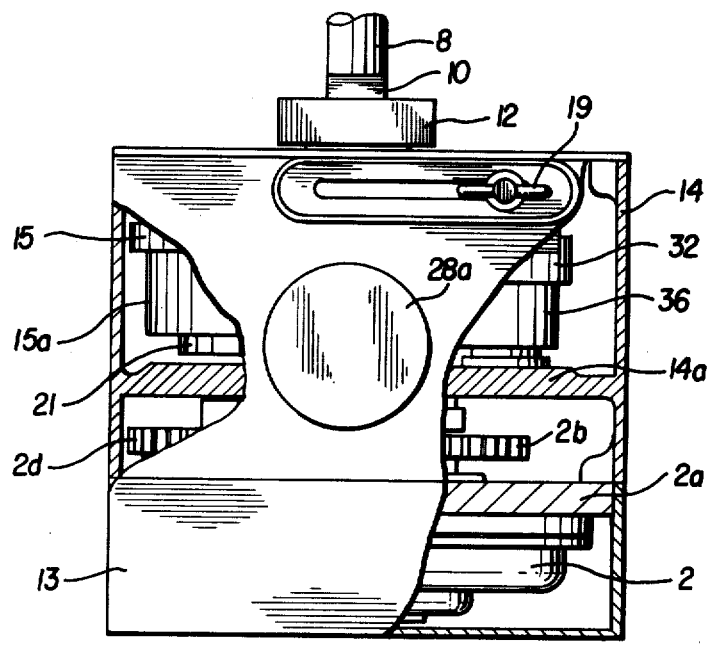
FIG. 5 is a left side rear view of FIG. 3.

Referring now to the drawings, there is shown the weaving device 9 according to the present invention wherein drive devices and a family of links are accommodated within housing members 13 and 14 and an extended rotatable shaft 11 is secured on the top of the housing member 14. A weaving arm 12 carrying a welding torch 8 is attached at one end thereof to the rotatable shaft 11 (FIG. 8), the welding torch 8 being supported on the other end of the weaving arm. The weaving arm 12 is attached to the rotary shaft 11 at a pivot formed by a fastening screw 10 of the rotary shaft being fixed in a concave on the rear face of the arm 12. Other fastening means are possible. The fastening position may be selectable and adjustable freely. The welding torch 8 may be mounted directly on the arm 12 via a bracket.

Figure 6:
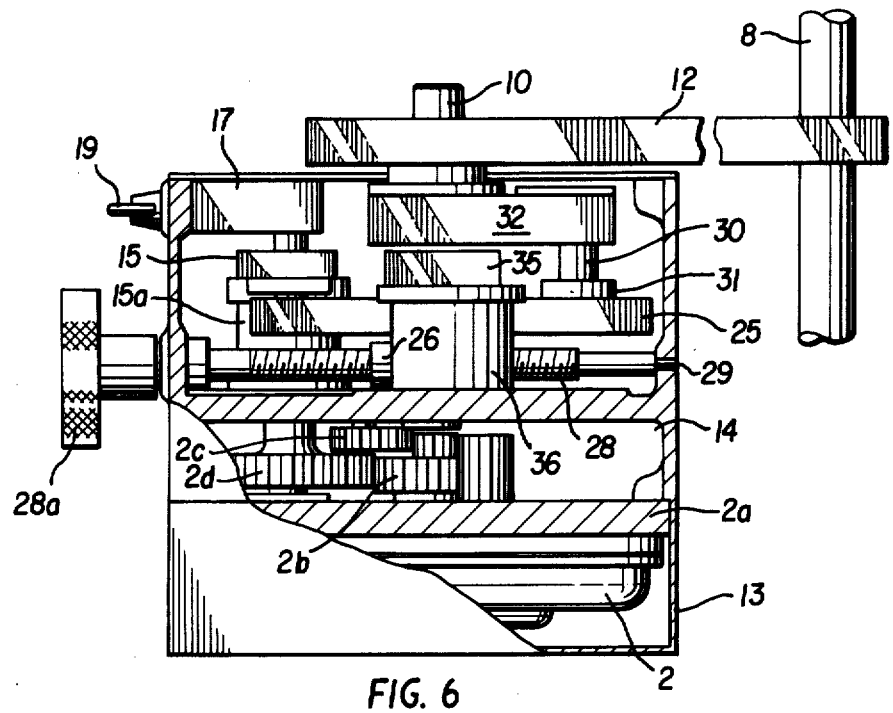
FIG. 6 is a right side view of FIG. 3 with a portion omitted.

The drive devices within the housing member 13, as indicated in FIG. 6, contain a motor 2 mounted on the bottom 2a of the housing member 14 and a pinion attached to an output shaft of the motor 2 for driving a drive shaft described below via reduction gears 2b, 2c and 2d disposed on a lower portion of the housing member 14. The housing member 13 is affixed to the bottom of the housing member 14 as a cover for the motor 2.

Figure 8:
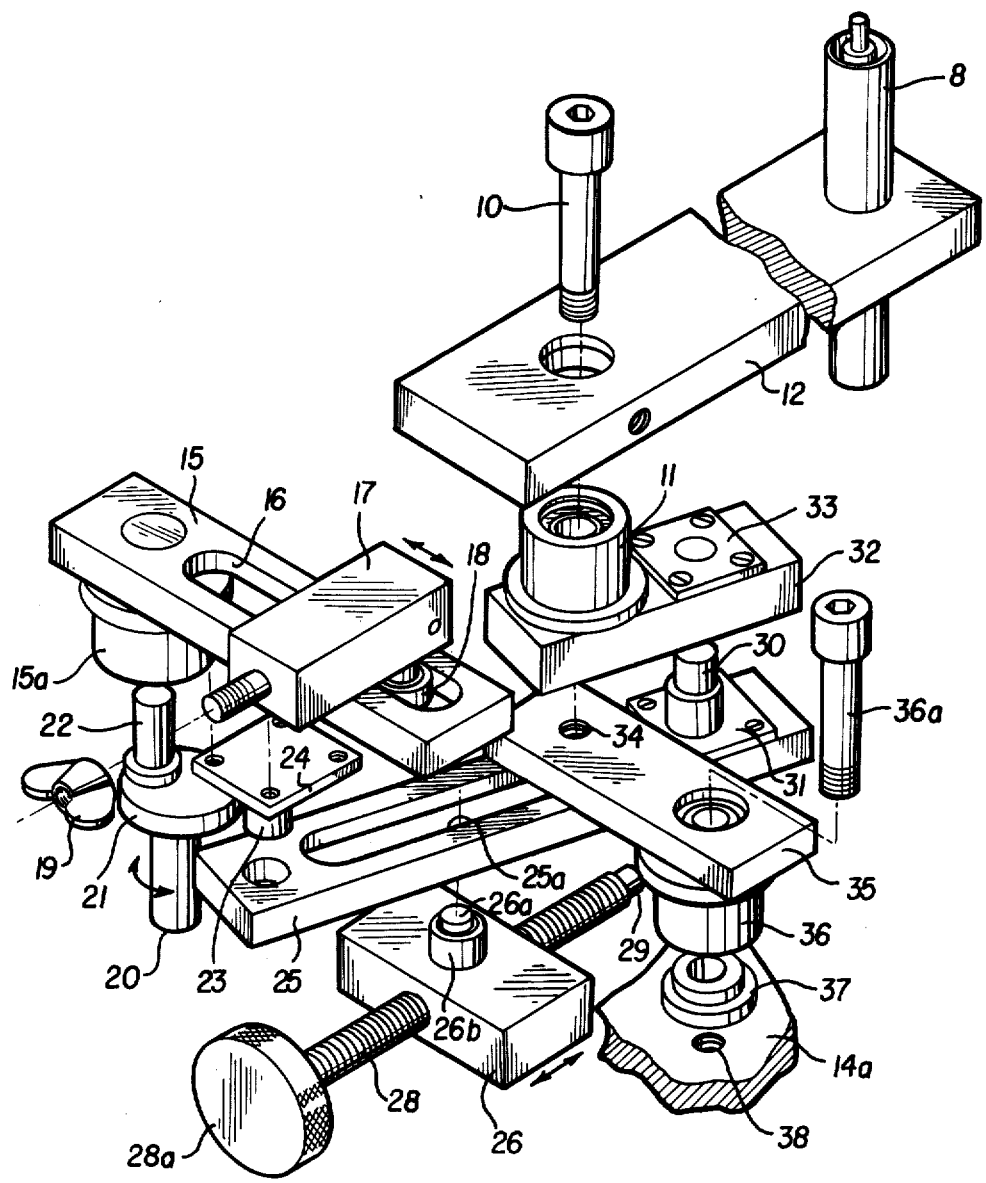
FIG. 8 is an exploded perspective view of the machine geometry.

The link assembly within the housing member 14 will now be described in detail with reference to FIG. 8. A drive shaft 20 is secured freely at a corner of an intermediate bottom plate 14a of the housing member 14. A disc 21 is mounted on the top of the shaft 20 and a gear 2d is mounted on a lower portion thereof. The gear 2d is rotated via the pinion of the motor 2 and the gears 2b and 2c. Though it is desirable that the drive shaft 20 reciprocates as indicated by the arrow, the drive devices should not be limited thereto. For instance, a double-head cam may be secured on the lowest end of the drive shaft 20 to actuate a rotation direction switching microswitch for the motor 2. An eccentric shaft 22 eccentric relative to the drive shaft 20 is mounted on the disc 21. A first link 15 is provided at one end thereof with a journal 15a and the eccentric shaft 22 is secured about the center of the journal 15a. The other end of the first link 15 has a slot 16 which receives a support shaft 18 (first shaft) fixed to a block 17. The block 17 may settle whenever desirable along the length of the first link 15 and in a given example a screw shaft 17a attached to the block 17 traverses an elongated slot in a back wall of the housing member 14 and may be secured wherever desirable through the use of a butterfly nut 19. The screw shaft is adjustable in position when it is desired to alter the pivot position of the first link 15. The pivot position is made alterable by shifting the support shaft 18 within the elongaged slot in the link or by shifting the link relative to the support shaft 18 as a reference point. As an alternative, the slot 16 may be formed by two vertical walls on the upper or lower face of the link 15. A support shaft 23 normal to the swinging surface of the first link is disposed on part of the link. In the illustrated embodiment, the support shaft 23 is provided integrally with a seat plate 24 attached to the lower face of the line 15 but may be mounted on a different member. One end of a second link 25 is pivoted about the support shaft 23 with the other end thereof carrying a support shaft 30. Like the support shaft 23, the support shaft 30 is attached to a seat plate 31 which in turn is secured on the second link 25. An elongated slot 25a is formed in the middle of the second link 25 to receive a support shaft 26a (second shaft) in the same manner as the slot is in the first link. The support shaft 26a, carrying a roller 26b, is attached to a block 26. The block 26 is made adjustable by a screw shaft 28 passing through the block 26 and the housing member 14 and a rotating handle 28a secured to one end of the screw shaft. When the screw shaft is turned, the bottom of the block 26 slides along the top of the intermediate bottom plate 14a. In this manner, the second link 25 is rotatable about the support shaft 26a.

One end of a third link 32 is pivoted on the support shaft 30 of the second link 25 with the other end thereof carrying a journal and rotary shaft 11. As described previously, the weaving arm 12 is secured on the rotary shaft 11. A journal support member 33 is provided for the support shaft 30 attached to the third link 32. A shaft screw 10 is inserted within the rotary shaft 11 and screwed into a screw hole 34 in a fourth link 35 having one end thereof disposed on the side opposite the rotary shaft mounting surface of the third link 32. The shaft screw 10 secured at one end of the fourth link 35 serves as the support shaft pivoting the rotary shaft 11. The weaving arm 12 is rotationally fixed to, and swings together with the third link 32.

The other end of the fourth link 35 is pivoted about part of the housing member 14, the pivoting portion forming a fixed pivot. The fixed pivot comprises a journal member 36 attached to the lower edge portion of the fourth link 35 and a shaft screw 36a is inserted within the link 35 and the journal member 36 and screwed into a screw hole 38 in the intermediate bottom plate 14a via a seat plate 37. In other words, one end of the fourth link 35 is rotatably secured to the shaft screw 36a on the intermediate bottom plate 14a. To give a better understanding of the overall structure, the second link 25 is shown longer than the actual length thereof. In fact, as indicated in FIG. 6, the fourth link 35 is positioned above the center of the second link.

Figure 7:
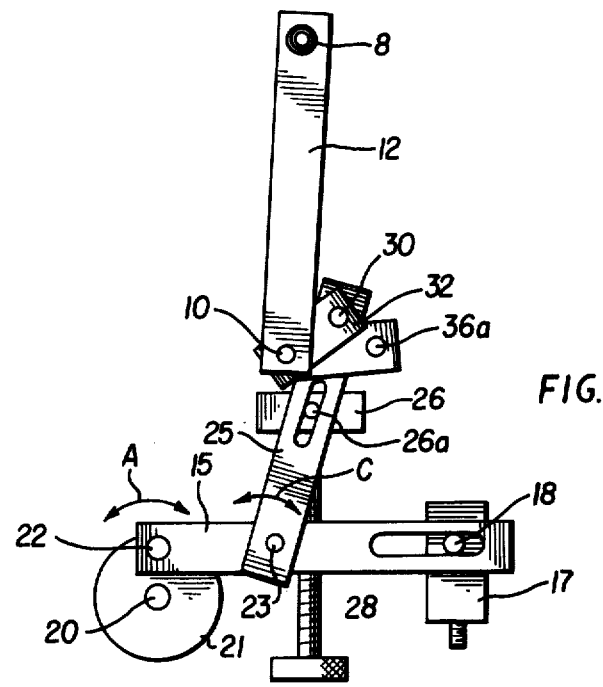
FIG. 7 is a schematic diagram of machine geometry according to the present invention.

As schematically shown in FIG. 7, within the weaving device according to the present invention, the eccentric shaft 20 moves in a circular arc as denoted by the arrow A to swing the first link 15 upon rotating the drive shaft 20. The support shaft 23 on the link 15 describes a pseudo-arc C with the height (not shown) thereof selectable by movement of the support shaft 18. The second link 25, on the other hand, moves the pseudo-arc C into the support shaft side 30 while the support shaft 26a serves as a pivot, the amplitude thereof being adjustable by movement of the support shaft 26a. The rotation and varying angle of the third link 32 pivoted on the support shaft 30 is transferred into the weaving arm 12 to weave the torch 8. Since the fourth link is pivoted on the third link 32 at one end thereof with the other end thereof being pivoted on the housing member 14 through the fixed shaft according to the present invention, the weaving arm 12 serves as a rotary shaft and extends from the top of the housing member 14 so that it does not come into contact with other members nor cause disorder of the weaving action, thus ensuring stable operation for prolonged use thereof. The weaving amplitude, height (stroke) and speed can be varied independently of each other. Efficient welding can be accomplished up to the final layer for one side welding such as flat butt welding and vertical butt welding. In addition, vertical fillet welding is possible with longer legs. The weaving device of an automatic welding machine according to the present invention enhances welding efficiency and reliability, reduces size requirements through the common drive device, simplifies construction, prevents error in operation and assures an extended working life. The weaving device is easy to control, handle and maintain, and is economical.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A welding torch weaving device comprising a first link having a first elongated slot at one end thereof and pivoted to a drive source at another end to make an arc shaped movement at said another end thereof, a first adjustably fixed shaft fitted within said first elongated slot in said first elongated slot in said first link, a second link having one end thereof pivoted on a mid portion of said first link and having a second elongated slot, a second adjustably fixed shaft fitted within said second elongated slot in said second link, a third link having one end thereof pivoted on the other end of said second link, and a fourth link having one end thereof pivoted on the other end of said third link and the other end thereof pivoted on a fixed pivot shaft, wherein a weaving arm is disposed on said other end of said third link for mounting a welding torch.

2. The welding torch weaving device of claim 1, wherein said elongated slots of said first and second links are formed by two vertical walls on the bottom and top of said links.

3. The welding torch weaving device of claims 1 or 2, including a housing wherein said first shaft is fixed within an elongated slot formed in said housing.

4. The welding torch weaving device of claims 1 or 2, wherein said second shaft is affixed to a movable member screwed into a screw shaft and movable in response to rotation of said screw shaft.

5. The welding torch weaving device of claims 1 or 2, wherein the pivot point of said second link on said first link is variable.

* * * * *